P. L. MARDIS.
CONTROL APPARATUS.
APPLICATION FILED JAN. 29, 1917.

1,323,301.

Patented Dec. 2, 1919.

WITNESSES:
Ed Plinke.
W. R. Coley

INVENTOR
Paul L. Mardis.
BY
Wesley G. Carr
ATTORNEY

UNITED STATES PATENT OFFICE.

PAUL L. MARDIS, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,323,301.  Specification of Letters Patent.  Patented Dec. 2, 1919.

Application filed January 29, 1917. Serial No. 145,276.

*To all whom it may concern:*

Be it known that I, PAUL L. MARDIS, a citizen of the United States, and a resident of Wilkinsburg, in the county of Allegheny and State of Pennsylvania, have invented a new and useful Improvement in Control Apparatus, of which the following is a specification.

My invention relates to control apparatus and especially to means for providing a relatively rapid power-actuated movement of a control drum or the like within predetermined limits.

The object of my invention is to provide a relatively simple and reliable apparatus of the above-indicated character, whereby, for example, a relatively rapid actuation of the control drum from its "off" to its first position and a subsequent slower movement thereof may be obtained.

More specifically stated, it is an object of my invention to provide a relatively simple and effective accessory device to a well-known type of electrically-controlled, fluid-actuated mechanism to secure the above-mentioned relatively quick movement within the prescribed limits.

Figure 1:
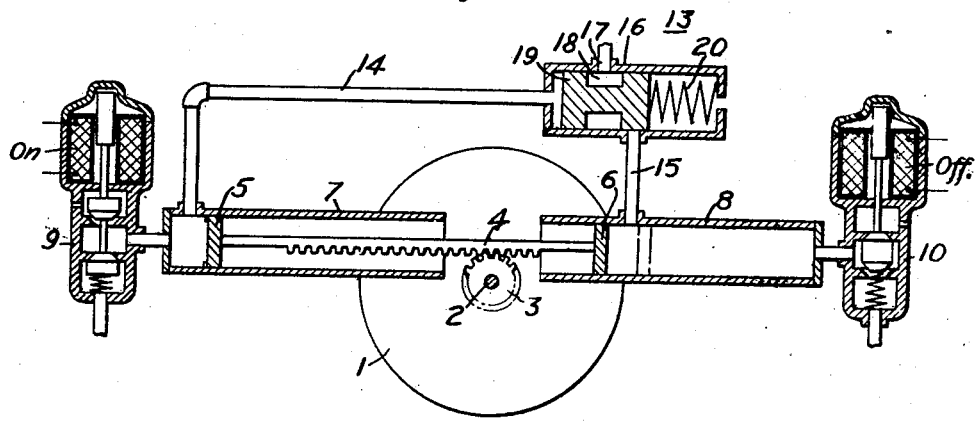
Figure 2:
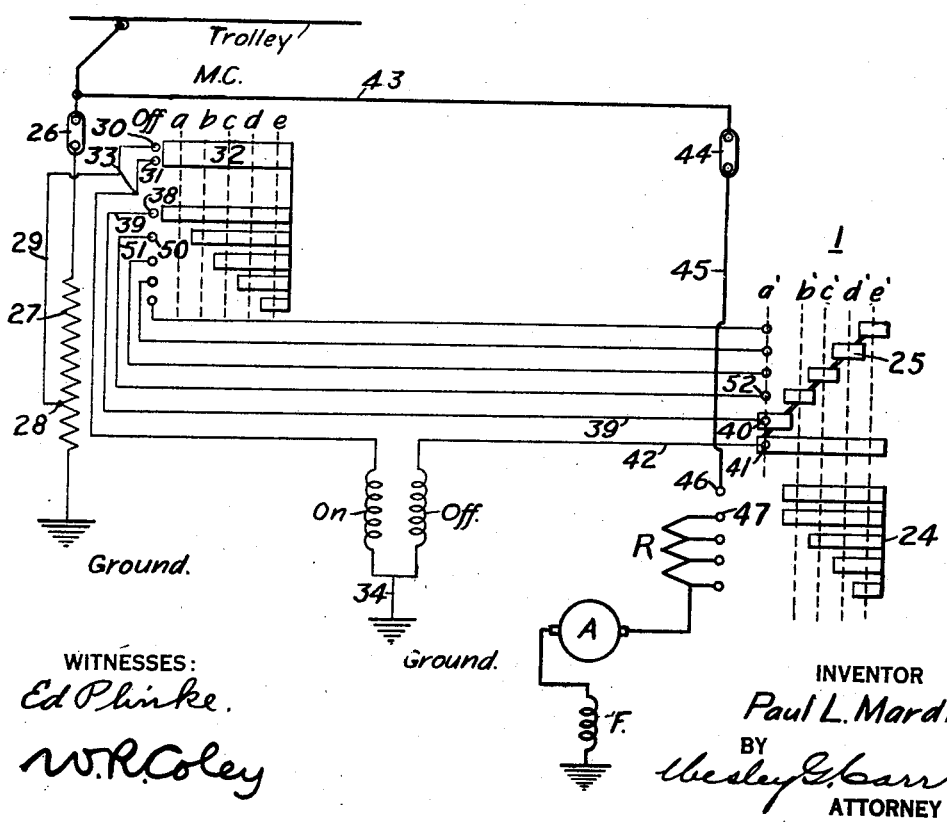

My invention may best be understood by reference to the accompanying drawing, wherein Figure 1 is a view, in longitudinal section, of a complete actuating mechanism constructed in accordance with my invention; and Fig. 2 is a diagrammatic view of the main and the auxiliary control circuits of a system utilizing the apparatus shown in Fig. 1.

Referring to Fig. 1 of the drawing, the structure shown comprises a control drum which is illustrated in outline at 1 and which is provided with the customary centrally located shaft 2 upon which a pinion 3 is rigidly mounted to suitably mesh with a horizontally movable rack member 4. Pistons 5 and 6 are secured to the respective ends of the rack member to thereby constitute a unitary piston member, a plurality of operating cylinders 7 and 8 being provided to suitably house the pistons 5 and 6. A plurality of dissimilar valve members 9 and 10, which are respectively governed by actuating coils "On" and "Off", are associated with the outer ends of the respective operating cylinders. The valve 10 is normally open to admit fluid pressure from any suitable source (not shown) to the cylinder 8, whereas the other valve 9 is normally closed to prevent the access of fluid pressure to the cylinder 7 and to effect communication between that cylinder and the atmosphere. The mechanism is thus normally biased to the illustrated position.

An accessory device 13 for the well-known type of mechanism just described comprises a pipe or passage 14 which communicates with the outer end of the operating cylinder 7; a second pipe 15 which communicates with the other cylinder 8 at a point near the outer face of the piston 6, the two pipes 14 and 15 leading into a suitable cylinder 16 that is also provided with an outlet pipe or passage 17 that is normally located opposite an annular groove or recess 18 in a cylindrical slide valve or duplex piston member 19 which is biased to the position shown within the cylinder 16 by a suitable helical spring 20.

The normal relation of parts of the accessory device 13 is such that the inlet opening of the pipe 15 is initially closed or cut off by one portion of the valve or piston member 19, while, as previously stated, the outlet 17 normally communicates with the central annular groove or recess 18.

The mechanical operation of the apparatus described, without regard to the electrical connections effected thereby, may be set forth as follows: Upon concurrent energization of the actuating coils "On" and "Off", the normal fluid-pressure conditions in the operating cylinders 7 and 8 are reversed, that is to say, fluid pressure is admitted through the valve 9 to the cylinder 7 and is released from the cylinder 8 through the valve 10.

However, it will be appreciated that a noticeable interval of time must necessarily elapse between the energization of the actuating coils and the building up of a sufficiently great differential value of air pressures in the desired direction to effect a movement of the pistons 5 and 6 toward the right. The desired movement may be increased in rapidity to any desired degree, however, by the use of a suitably designed accessory device 13, wherein fluid pressure is admitted to the cylinder 7 by the energization of the "on" coil, and the valve or piston member 19 is immediately actuated toward the right, by reason of the rush of operating fluid through the pipe 14 to the accessory cylinders 16. The inlet pipe 15 is thereby uncovered and thus there is provided an additional exhaust opening of any desired size from the cylinder 8, wherein fluid pressure normally is present, through the pipe 15, the annular groove 18 and the outlet 17. Such rapid release of fluid pressure from the cylinder 8 through the accessory device 13 causes the difference in pressure values between the cylinders 7 and 8 to build up to an operative value almost instantaneously, and a rapid movement of the pistons 5 and 6 toward the right is effected.

However, as soon as the piston 6 occupies a position corresponding to the dotted lines within the cylinder 8, that is, a position just beyond the location of the inlet pipe 15, communication between the cylinder 8 and the accessory device 13 is thereby cut off, and the rate of any further movement of the main pistons is solely dependent upon the size of the exhaust port in the valve 10. Thus, by suitable design of parts, the control drum 1 may be rapidly actuated to its first position as soon as a governing master controller, or the like, is actuated, whereas, subsequent movements of the drum through its successive steps may be accomplished in a more gradual manner.

To arrest the movement of the main piston member and the control drum in the position indicated by the dotted lines or at any other time, it is merely necessary to deenergize the "off" coil, whereby balanced fluid-pressure conditions obtain in the cylinders 7 and 8, and a positive and reliable stoppage of the mechanism is secured. To effect the return movement of the mechanism, the actuating coils "On" and "Off" are concurrently deënergized, whereby fluid-pressure conditions in the cylinders 7 and 8 revert to the original state and the desired movement is produced.

A control system for effecting the desired results is shown in Fig. 2 as comprising suitable supply-circuit conductors respectively marked "Trolley" and "Ground"; an electric motor having an armature A, and a field winding F of the series type; a variable main-circuit resistor R; and the control drum 1 which governs the exclusion from circuit of the resistor R or any other desired control service and is, in turn, governed by a master controller MC that is adapted to occupy a plurality of operative positions $a$ to $e$, inclusive.

The control drum 1 is adapted to occupy a preliminary position $a'$ and a plurality of operative positions $b'$ to $e'$, inclusive. A main-circuit contact segment 24 and an auxiliary-circuit contact segment 25 of suitable configurations are provided upon the drum.

Assuming that the various parts of the operating mechanism occupy the illustrated positions, the operation of the system may be set forth as follows: Upon movement of the master controller MC to its initial operative position $a$, a circuit is established from the trolley through a switch 26 and a control resistor 27 to the other supply-circuit conductor Ground.

A further circuit is completed from a suitable low-voltage tap 28 of the control resistor through conductor 29, control fingers 30 and 31, which are bridged by contact segment 32 of the master controller, conductor 33, the actuating coil "On" and conductor 34 to ground.

Another circuit is simultaneously completed from the contact segment 32 through control finger 38, conductor 39, control fingers 40 and 41, which are bridged by the auxiliary-circuit contact segment 25 of the control drum 1 in its initial or normal position $a'$, conductor 42 and the actuating coil "Off" to the negative conductor 34.

Consequently, the previously described relatively rapid movement of the control drum 1 to its initial operative position $b'$ is effected, and, in such position, contact segment 25 of the control drum 1 becomes disengaged from the control finger 40, thereby deënergizing the actuating coil "Off" and causing the control drum to remain in the position $b'$, in accordance with the previously discussed principles.

As soon as the control drum 1 occupies its position $b'$, a main circuit is completed from the trolley through conductor 43, switch 44, conductor 45, control fingers 46 and 47, which are bridged by the main-circuit contact segment 24 of the control drum 1, the entire resistor R, the armature A and the field winding F to the negative conductor Ground, whereby the motor is started into operation.

To effect further movement of the control drum 1, the master controller MC is actuated to its position $b$, whereupon, a new circuit is completed from the contact segment 32 thereof, through control finger 50, conductor 51 and control finger 52 of the control drum 1 which engages contact segment 25 thereof in position $b'$. Thus, the previously interrupted circuit of the "off" coil is again completed to produce movement of the control drum to its position $c'$, wherein movement of the control drum is again arrested by reason of the disengagement of the contact segment 25 from the control finger 52.

Thus, a predetermined section of the resistor R is excluded from circuit by the contact segment 24 to further accelerate the motor.

Since the subsequent operation of the system is similar in all respects to the operating step last described, no further exposition thereof is deemed necessary.

I have thus provided a relatively simple and reliable means for effecting a practically instantaneous response of a main control drum to the initial actuation of a governing master controller, until the first operative position of the main control drum is reached, and a subsequent slower movement of the drum through its successive positions. The action is entirely automatic and independent of the train operator, who merely actuates his master controller in the customary manner.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with a piston member, and housing means therefor, of means for admitting an operating medium to the one or the other side of said piston member under predetermined conditions, and means dependent upon the admission of such medium to one side of the piston member for releasing the medium from the other side.

2. The combination with a piston member, and housing means therefor, of means for normally admitting an operating fluid to one side of said piston member, means for admitting an operating fluid to the other side of said piston member under operating conditions, and means for thereupon effecting the release of fluid from the first named side of the piston member.

3. The combination with a piston member, and housing means therefor, of means for admitting an operating fluid to the one or the other side of said piston member under predetermined conditions, and means dependent upon the admission of such fluid to one side of the piston member for releasing fluid from the other side until the piston member has moved a predetermined distance.

4. The combination with a piston member, and housing means therefor, of means for normally admitting an operating fluid to one side of said piston member, means for admitting an operating fluid to the other side of said piston member under operating conditions, and means for thereupon effecting the release of fluid from the first named side of the piston member until the piston member occupies a predetermined position.

5. The combination with a piston member, and housing means therefor, of means for normally admitting fluid pressure to one side of said piston member, and means dependent upon the admission of fluid pressure to the other side of the piston member for releasing the normally-present fluid pressure.

6. The combination with a piston member, and housing means therefor, of means for normally admitting fluid pressure to one side of said piston member, and independent piston means moved to such position by the admission of fluid pressure to the other side of the piston member as to rapidly release the normally-present fluid pressure until a predetermined position of said piston member is reached.

7. The combination with a main piston member, and housing means therefor, of means for normally admitting fluid pressure to the first side of said piston member, auxiliary piston means, an operating cylinder therefor having an outlet and having a plurality of inlets respectively communicating with opposite sides of said main piston member, said piston means being actuated by the admission of fluid pressure to the second side of said main piston member to effect communication between said outlet and the first side.

8. The combination with a main piston member, and housing means therefor, of means for normally admitting fluid pressure to the first side of said piston member, an auxiliary piston member, an operating cylinder therefor having an outlet and having a plurality of inlets respectively communicating with opposite sides of said main piston member, said auxiliary piston member being actuated by the admission of fluid pressure to the second side of said main piston member to effect communication between said outlet and the first side until a predetermined position of said main piston member is reached.

9. The combination with a main piston member and housing means therefor, of means for normally admitting an operating fluid to the first side of said piston member, an auxiliary piston member, an operating cylinder therefor having a normally unused outlet and having a plurality of inlets respectively communicating with opposite side of said main piston member, and means for normally biasing said auxiliary piston member to a position cutting off communication with said first side of the main piston member, said auxiliary piston member being actuated by the admission of fluid pressure to the second side of the main piston member to effect communication between said outlet and said normally cut off inlet until a predetermined position of the main piston member is reached.

10. The combination with a plural-step controller, of an operating mechanism comprising a piston member, operating cylinders therefor, a valve for normally admitting fluid pressure to one of said cylinders, and auxiliary valve means communicating with both cylinders and adapted to effect a relatively rapid decrease of the normally present pressure to actuate said controller through its first step.

In testimony whereof, I have hereunto subscribed my name this 20th day of January, 1917.

PAUL L. MARDIS.